United States Patent [19]

Grunig

[11] Patent Number: 4,610,235
[45] Date of Patent: Sep. 9, 1986

[54] HYDRAULIC DRIVE SUPERCHARGER FOR INTERNAL COMBUSTION ENGINES

[76] Inventor: R. Carricarte Grunig, Calz. I, Aragoza 126, Col. Moctezuma, 15500 - Mexico City, Mexico

[21] Appl. No.: 521,403

[22] Filed: Aug. 8, 1983

[30] Foreign Application Priority Data

Aug. 9, 1982 [MX] Mexico .................................. 194310

[51] Int. Cl.⁴ ............................................. F02B 33/40
[52] U.S. Cl. ..................................... 123/565; 60/304; 60/316; 417/406
[58] Field of Search ................. 60/304, 307, 316, 607, 60/608; 123/559, 565; 417/405, 406, 407

[56] References Cited

U.S. PATENT DOCUMENTS

| | | | |
|---|---|---|---|
| 1,628,894 | 5/1927 | Maupin | 60/316 X |
| 2,083,167 | 6/1937 | Lamere | 417/406 X |
| 2,845,774 | 8/1958 | Bertin | 60/606 X |
| 3,869,866 | 3/1975 | Timoney | 60/608 X |
| 3,921,403 | 11/1975 | McInerney et al. | 123/559 X |
| 3,935,848 | 2/1976 | Gamell | 123/565 |
| 4,285,200 | 8/1981 | Byrne et al. | 60/607 |

FOREIGN PATENT DOCUMENTS

1012365 4/1952 France .................................. 60/606
519 1/1981 Japan ..................................... 60/304

*Primary Examiner*—Michael Koczo
*Attorney, Agent, or Firm*—Kerkam, Stowell, Kondracki & Clarke

[57] ABSTRACT

An oil driven supercharger is disclosed with the turbine operating on oil from the lubricating system of an internal combustion engine or from a separate source of pressure oil. In the disclosed form of the invention, the turbine drives a pair of air compressors one at each end of a shaft to which the turbine rotor is centrally connected. The disclosed turbine is provided with several means for adjusting the flow rate of the oil used to drive the turbine to accommodate for different sizes of air compressors and different engine sizes. Also disclosed are several examples of how the paired air compressors may be connected to the intake manifold of an engine and/or to the exhaust manifold to dilute exhaust gases and assist in the combustion of uncombusted exhaust products.

5 Claims, 9 Drawing Figures

HYDRAULIC DRIVE SUPERCHARGER FOR INTERNAL COMBUSTION ENGINES

BRIEF SUMMARY OF THE INVENTION

Turbochargers used in internal combustion engines are intended to introduce under pressure into the engine cylinders the carburated mixture in the case of Otto-cycle engines, or simply air in the case of Diesel-cycle engines.

For this reason, turbocharged engines have the advantage over natural-aspiration engines of a greater volumetric yield which enables them to increase their compression and combustion pressures, the result of which is higher power per weight of the unit.

The invention will be described in reference to a Diesel-cycle engine.

A conventional turbocharger has a turbine having an output shaft and the opposite end of which is attached to a compressor. The compressor may be of the centrifugal or axial flow type, although the former are more common. The aforementioned parts are separated by a wall that allows the circulation of two different gas flows without mixing or interference with one another. To wit:

One belonging to the exhaust gases expelled from the engine cylinders, which as they pass through the head or housing of the turbine impart movement to it at very high revolutions. The turbine element in turn forces the compressor located on the opposite side of the axle to turn. The function assigned to the compressor is to compress the air inside the engine's intake manifold, so that when its valves are opened efficiency in filling its cylinders is increased in order that the amount of fuel from the injectors can be increased without producing deficient combustion.

What has been said up to this point regarding the overfeeding of air also involves other devices known as superchargers or Roots compressors, although they differ from turbochargers in design and means of drive. They achieve their energy directly from the engine by means of gears or through belts and pulleys. With such devices it is possible to increase engine power, although as they work they consume a good share of the engines' increased power. This is due to the fact that their components weigh much more than the compressor, shaft and turbine of the turbocharger, and most essentially because, due to their construction and operating characteristics, it is not possible for them to make use of the kinetic energy carried of the exhaust gases leaving the engine cylinders.

As the size of the compressor is increased its output also increases. But inasmuch as the turbine surfaces in contact with the exhaust gases would also have to be increased, any improvement is generally counterproductive. From the foregoing, several problems can be seen to arise, the most important of which is that of achieving adequate lubrication for all the components requiring it.

To the drawbacks of turbochargers driven by exhaust gases that have already been mentioned, may be added others:

1. The high temperatures and abrasion that have to be borne by parts in direct contact with the exhaust gases make it necessary that they be constructed of costly alloys. This is especially true of the turbine so that it can adequately bear the constant passage of the exhaust gases.

2. The proximity of the respective turbine and compressor housings means that the heat of the gases driving the former is transferred to the feed air compressed by the latter, reducing its density. In order to increase this density, many engines are equipped with a radiator in their air feed system to reduce the temperature of the air.

3. The classic turbocharger begins its movement without any oil pressure in its bearings, and not infrequently, through irresponsibility or ignorance on the part of the operator, this may occur at very high revolutions, which results in serious damage.

4. The exhaust gases break down and contaminate the oil required for lubricating and cooling the turbocharger. As the exhaust gases pass the turbine, the turbine absorbs a considerable amount of heat which must be dissipated by the cooling system that is generally intended for such tasks in the engine.

5. Each engine model or brand requires a special base that is integrated into the exhaust manifold for the engine. As a result, there is a wide variety of devices on the market.

Next we shall consider some general conditions of the hydraulic-drive supercharger of this invention. This device offers the combined advantages of Roots compressors and classic turbochargers. Unlike the former, it does not have to withstand high temperatures, and although it also consumes part of the engine energy, it does so to a much lesser extent because the lightness of its components lessens its resistance to turning.

With respect to classic turbochargers, as components do not need to be heavy in order to prevent distortions from high temperatures, the unit weights less than those driven by exhaust gases.

Full freedom in selecting the length of the oil feed and return hoses with which it operates and lubricates itself give it greater flexibility in where it may be located, removed as it should be from the exhaust system. The site may be anywhere on the chassis, body or machine where the engine is working. With a suitable base, it may be screwed directly onto a line of the engine's lubricating system in order to take from it the fluid it requires for its operation. It is reasonable to assume with this type of supercharger that, inasmuch as the exhaust from combustion is not obstructed or held back by the turbine, the overfeeding engine will operate better.

DETAILED DESCRIPTION OF THE INVENTION

One of the essential characteristics of the supercharger of the invention lies in the fact that its drive is hydraulic. For this purpose use is made of the oil flow lubricating the parts requiring it, and ignoring the force of the expanding exhaust gases that is used to operate conventional devices.

Referring now particularly to FIGS. 1 through 4, the supercharger generally designated 10 includes a hydraulic turbine motor 12 and a pair of compressors 14 and 16. Pressure oil from the engine lubricating system is connected to the oil inlet nipple 18 and passes through and about the turbine 20 and exits from the supercharger housing at a nipple 22 to be returned to the engine lubricating system.

Figure 3:
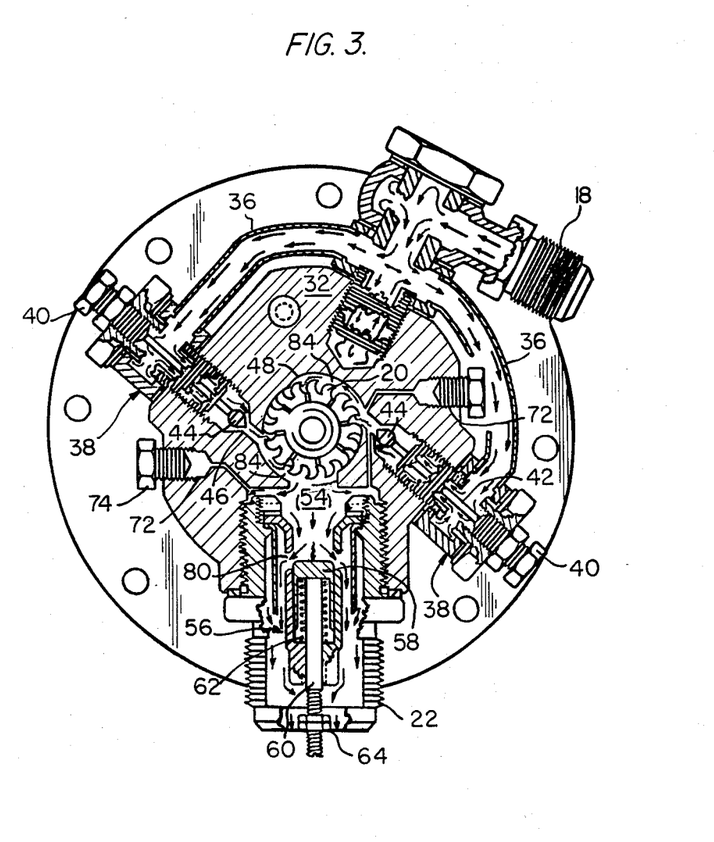
FIG. 3 is a fragmentary partial sectional view on line 3—3 of FIG. 2.

As seen in FIG. 3, the oil under pressure sent from any site in the engine's lubrication system, or from the hydraulic system of any machine, or from an outside pump and hoses, enters the supercharger's connection 18 and from there is taken inside the housing where the hydraulic turbine 20 is housed; the latter, which may be a simple gear, as it turns transmits its movement to the shaft 24 and through this to one or more compressor turbines 14 and 16. These compress the air reaching them through inlets 26 in their heads or housings, which inside contain a wheel or impeller 28, and then the compressed air is sent to its outlets 30 to, for example, the intake manifold.

As the compressors are mounted on a single axle, the blades of each one of them must be oriented in opposite directions. That is, those placed on the hub of the left compressor must be towards one side, and those of the right compressor towards the other. Otherwise, while one or more compressors on one side took in air to introduce it into the intake manifold, those on the opposite side, turning in the same direction, would be taking the air out.

Figure 1:
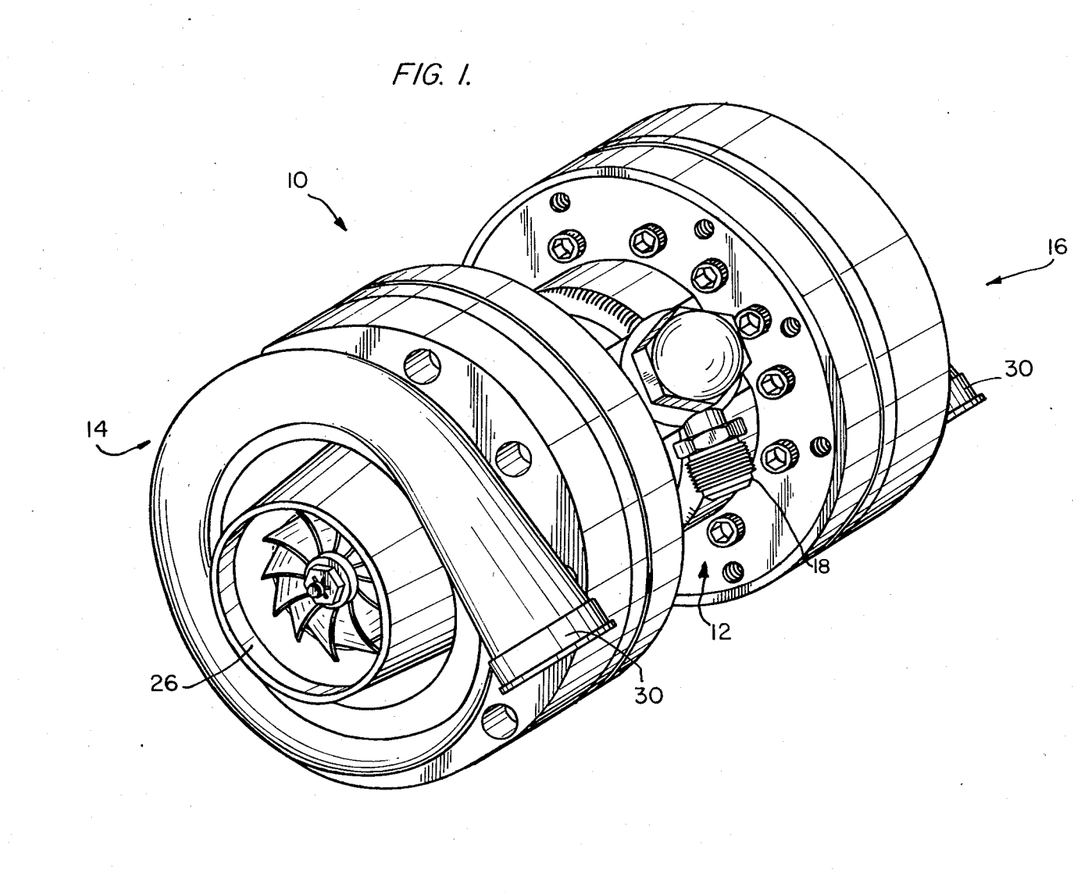
FIG. 1 is a perspective view of a supercharger constructed in accordance with the teachings of the present invention.
Figure 2:
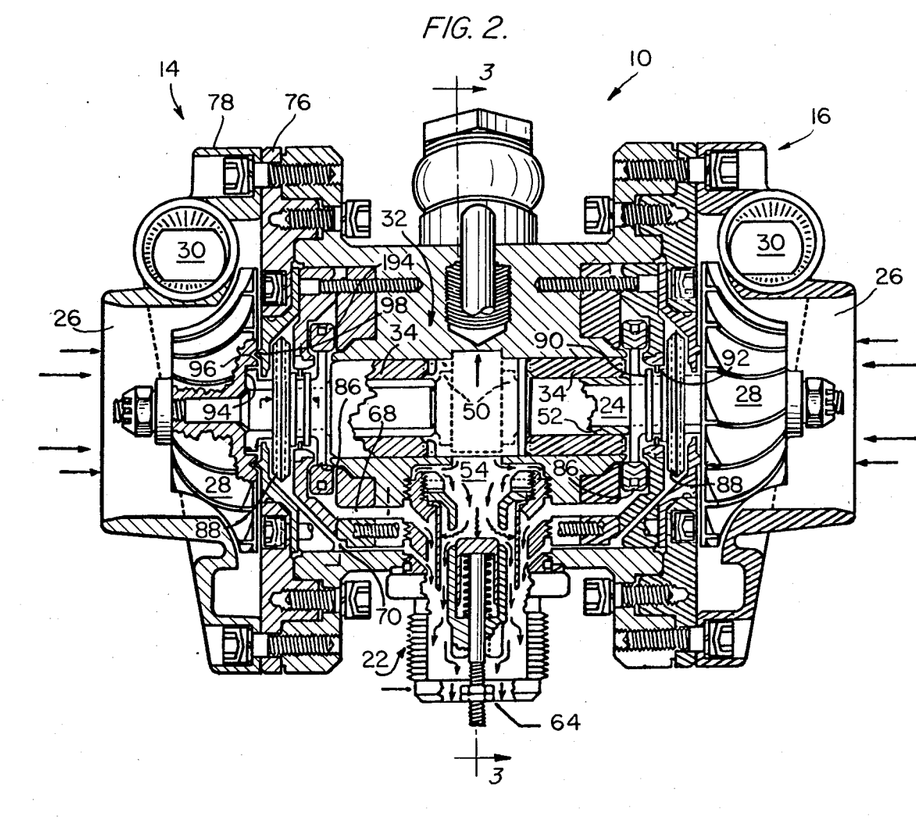
FIG. 2 is a partial sectional view through the apparatus illustrated in FIG. 1.

The shaft 24 supporting the turbine 20 and the pair of impellers 28 are supported in the center part of the turbocharger housing 32 in, for example, sleeve bearings 34. It will be recognized that the sleeve bearings 34 may be ball bearings or roller bearings without departing from the scope of the present invention.

From the inlet connector or inlet 18, a pair of header pipes 36, FIG. 3, direct the pressure oil to inlet controllers generally designated 38. Each of the controllers 38 is provided with an adjusting nut 40 which has secured to its lower end a shaft 42 controlling a valve plug 44 which, as is apparent, is movable toward and away from the tapered inlet 46 which directs the pressure oil against the blades of the turbine 20 in known turbo fashion. The turbine rotates in a bore 48 in the housing 32 and pressure oil is retained in the confines of the teeth of the turbine by flanges 50 forming a portion of shaft sleeves 52, FIG. 2 of the drawing.

Figure 4:
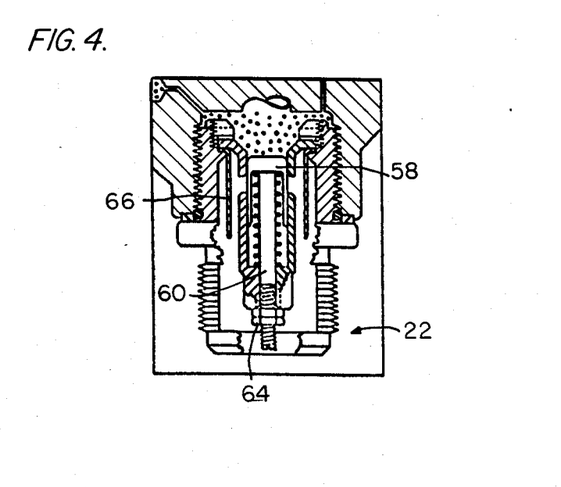
FIG. 4 is a view of a portion of the control mechanism in another position from that illustrated in FIG. 3.

The pressure oil exits the turbine in chamber 54 and then flows about a controller 56 having a seat member 58 which is carried by a valve stem 60, spring urged by spring 62 into a passage closing position as illustrated in FIG. 4. The pair of nuts 64 on shaft 60 permits adjustment of the normal closed position of the control valve mechanism 60. It will also be noted from FIGS. 2, 3, and 4 that surrounding the outlet from chambers 54 is a tubular deflector 66, which helps to maintain the flow of oil to the outlet 22 and prevents backflow of oil into passages such as illustrated at 68 and 70 which provide lubrication for the moving blades of the turbine as to be further described hereinafter.

The housing 32 is also provided with bores and passages 72, which are shown with plugs 74 therein which plugs may be removed for reception of suitable pressure gauges or monometers to permit visual maintenance of the pressure of the oil which rotates the turbine and, in turn, the pair of compressors.

It can now be understood that the supercharger only begins to operate when the pressure of the oil with which it operates is sufficient to move the valve 58. We may also observe that basically the same turbine may be used to drive compressor turbines having a greater diameters, thereby increasing the volumetric output of the device, so long as the plates 76 and heads 78 are replaced and fitted with large compressors.

The pressure accumulated in the chamber 54 forces the piston or valve 58 to descend, working against the thrust of its spring 62, to the point where the discharge vents 80 are uncovered in the cylinder where it is operating. The flows that exit through these vents are joined together in the outlet connection 22 will determine the speed of the supercharger, and their pressure will determine the torque of the latter's shaft.

A supercharger such as the one we are concerned with, connected to an engine with a given pressure and a specific speed, having worn out its components such as connecting rod bearings and oil pump, etc., will revolve less quickly than one with its parts in normal condition. For this reason, in order to reach its ideal working speed, it will be necessary to have recourse to controls 38 so as to allow a greater passage of lubricant inside the housing of the turbine 20. This will be achieved by raising the screws 40, and when the opposite is required, they will be lowered to limit the incoming flow which they control.

The inlet openings to the turbine blades do not necessarily have to be cylindrical, nor do the ends of the elements regulating the access of the oil passing through them; rather, they may take the most suitable form, such as that of a rectangular cross section arranged lengthwise to the teeth or blades belonging to the engine wheel so that the drive flow is applied over the greatest possible surface area.

It will be necessary to reduce or increase the device's speed when it is wished to alter its volumetric capacity upwards or downwards so that is can be used on larger or smaller engines, or when the size of the engines makes it essential to have on the drive shaft compressors of a greater diameter and thus a greater mass that requires a difrenent speed to turn within its correct dynamic equilibrium. In summary, we find that any change which it may become necessary to make in the volume and presure of the fluid with which the supercharger is operating can be achieved individually or jointly with the adjustment nuts 60 of the regulator valve 38.

In order to have uniform control over the pressures present in all the areas included within the housing of the turbine and adjacent sites, these pressures are communicated by means of the counduit 68, FIG. 2, plus others that will be present should they be needed for that purpose.

When the piston valve 58 descends, the flows exiting from its cylinder through the vents 80 are directed downward by the sleeve 66. This prevents the oil under pressure from going on to unsuitable places through the conduits 68 etc.

The chamber in the housing 32 which receives the turbine 20 is not circular in plan, but is provided with two enlarged zones with each adjacent the pair of oil inlets and designated 84. These enlarged zones are useful in increasing the surface area of the blades of the turbine rotor 20 exposed to the thrust of the oil pressure. This design of the chamber for the turbine rotor makes it possible to transmit more effectively a greater torque to the shaft 18 and in turn the compressor impellers 28. It is also to be recognized that while the blades of the turbine are shown integral with respect to the hub of the turbine impeller, the blades may be slideably mounted to the hub in slots or the like as is known in the pump art. Further, it will be appreciated that without the enlarged zones 84, in the housing for the impeller 20, oil pressure would be received only by those blades which at a given point in time pass the intake conduit or conduits in the housing.

In order to minimize lateral play in the shaft 24, supporting the turbine rotor and the compressors 28, the shaft 24 carries a pair of spaced discs or plates designated 86 and 88 and therebetween oil seals 90 and 92. The bearing plates 86 have enlarged peripheral zones 94 which slideably or rotatably engage stationary bearing surfaces forming a part of the housing 32. Oil lubricating the plate like bearing element 88 and its contacting surfaces in the housing is thrown by centrifugal force into the oil drain channels such as channels 68 hereinbefore described. Further, it will be appreciated that discs 88 may be provided with radial grooves in the flat surfaces thereof to assist in discharging lubricating oil into, for example, the channel 70.

Figure 2A:
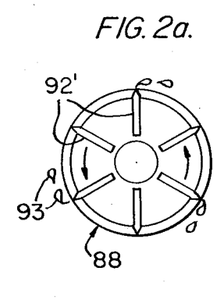
FIG. 2a is an enlarged plan view of the disc 88.

FIG. 2a is an enlarged view of the disc 88 showing the radial grooves 92' in one of its faces which radial grooves assist in the discharge of oil used for lubricating the supercharger, diagrammatically, the oil is illustrated as droplets 93.

Figure 2B:
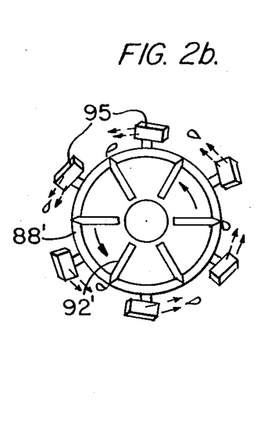
FIG. 2b is a view like FIG. 2a of a modified form of the invention showing oil discharge plates 95 attached to the periphery of the disc 88.

Referring now to FIG. 2b, a similar view of the disc 88 shows the discharge grooves 92'. In this form of the device plates 95 are shown attached to the periphery of the disc which plates collect and discharge oil for return via the internal passages 70 to the outlet 22.

Further, in FIG. 2, it will be seen that the back wall 194 of each of the compressor impellers 28 is provided with grooves such as shown at 96 which mate with corresponding circular bosses 98 in the housing 32 and these elements 96 and 98 form a labyrinth thus reducing the pressure and/or volume of air that could escape through the lubricating conduits and not exit from the compressor outlets 30.

Turning now to the schematic drawings, FIGS. 5, 6, and 7, the utility of the improved supercharger will be described.

Figure 5:
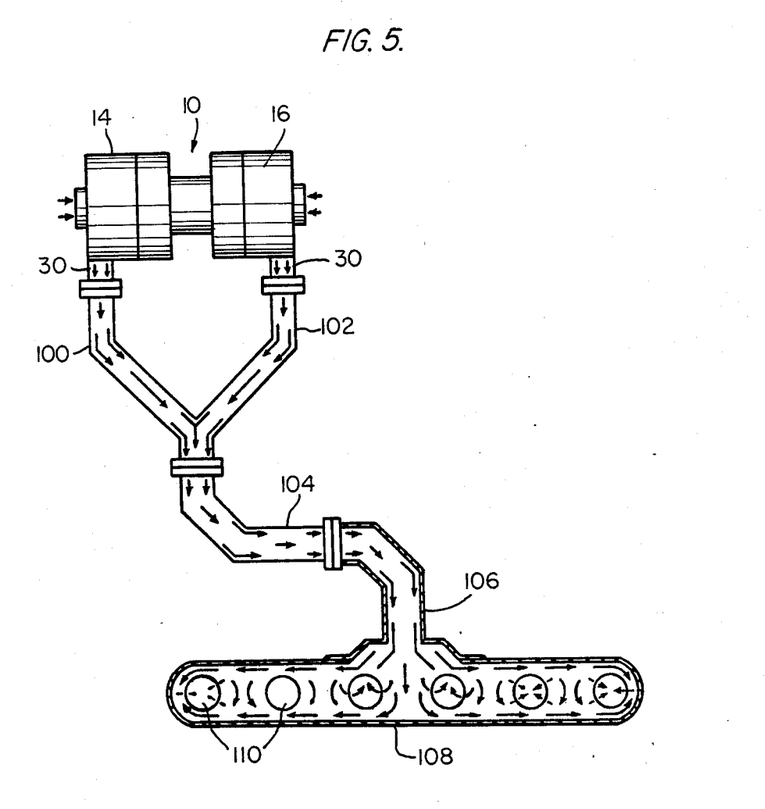
FIG. 5 is a diagrammatic view illustrating one example of connecting means between the dual turboblowers or compressors and the air manifold of a diesel engine.

In FIG. 5, we see that the air outlets 30 of the supercharger are linked by the tubes 100 and 102 to a common tube 104. This arrangment, together with the tubes 106, allows the air flow from the two compressors to be directed together to overfeed the engine air inlet header or manifold 108 which connects with each inlet ports 110.

Figure 6:
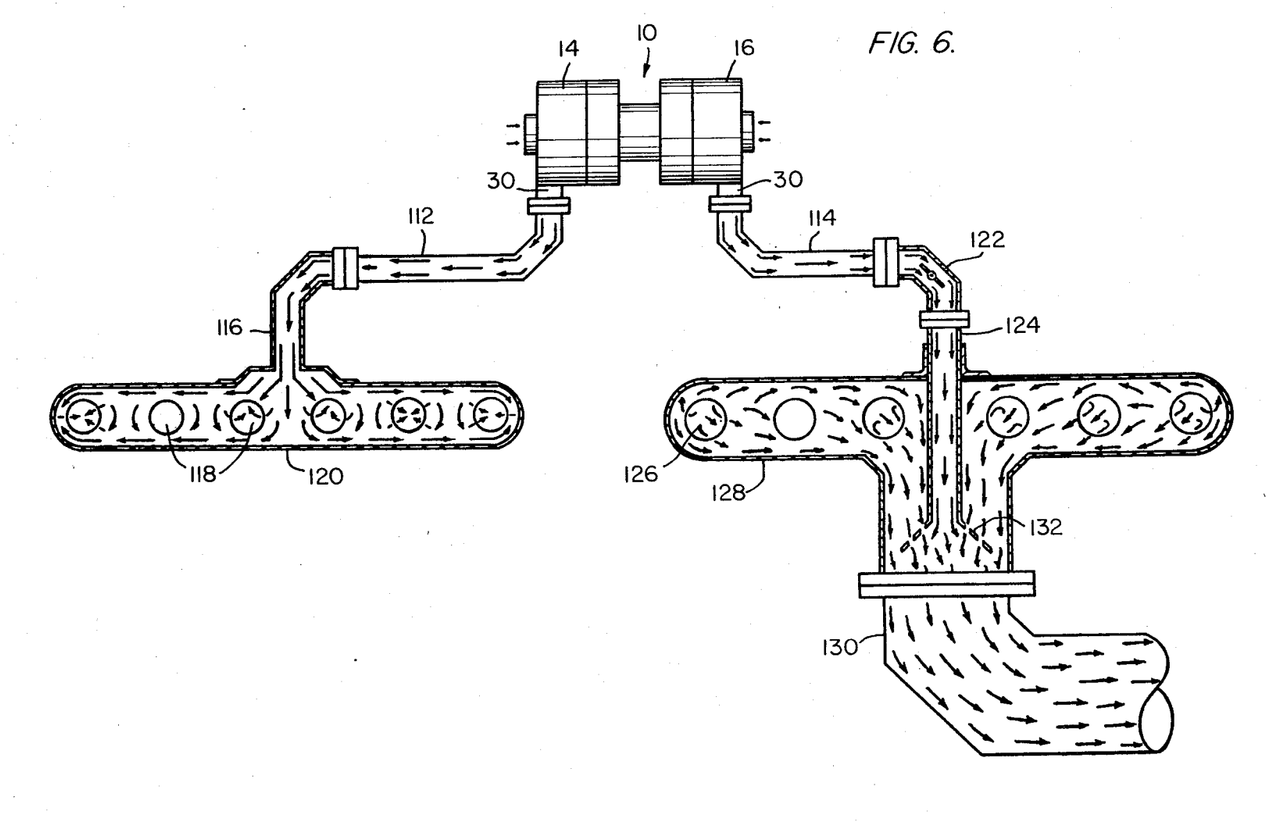
FIG. 6 illustrates an example of the invention wherein one blower is connected to the intake manifold and the other is associated with the exhaust manifold.

Referring to FIG. 6 it can be seen that the turbocharged air exiting through the heads 30 has tubes 112 and 114 that are independent. Through the tubes 112 and 116, the flow from one of the compressors 14 is sent to overfeed the engine when it is directed towards its cylinders through the ports 118 of the intake manifold 120. The other air current is sent through the tubes 114, 122 and 124 so that the combustion remnants exiting without being consumed through the exhaust ports 126 of the exhaust manifold 128 are consumed burning during their trip to the outside through the tube 130. In this way, and for the stated purpose, the residual combustibles and lubricating vapors are provided oxygen and burned.

In the elbowed tube 122 we see a butterfly valve 124. This serves to block the exhaust system's communication with the supercharger should it be desired. Such a case might be to check the efficiency of combustion inside the engine or for any other advisable cause.

At the lower end of the tube 124 is provided a diffuser 132, which may have on its skirt perforations 134. These will serve to create turbulence to make as homogeneous as possible the mixture of exhaust gases and the fresh air so that any remaining combustibles discharged from the engine cylinders may be consumed.

Giving the supercharger the mixed use described above will be especially useful in poorly tuned or worn engines. Although the desired results of reducing atmospheric pollution may not be achieved with each system, the device will in any case achieve a cleaner exhaust.

Figure 7:
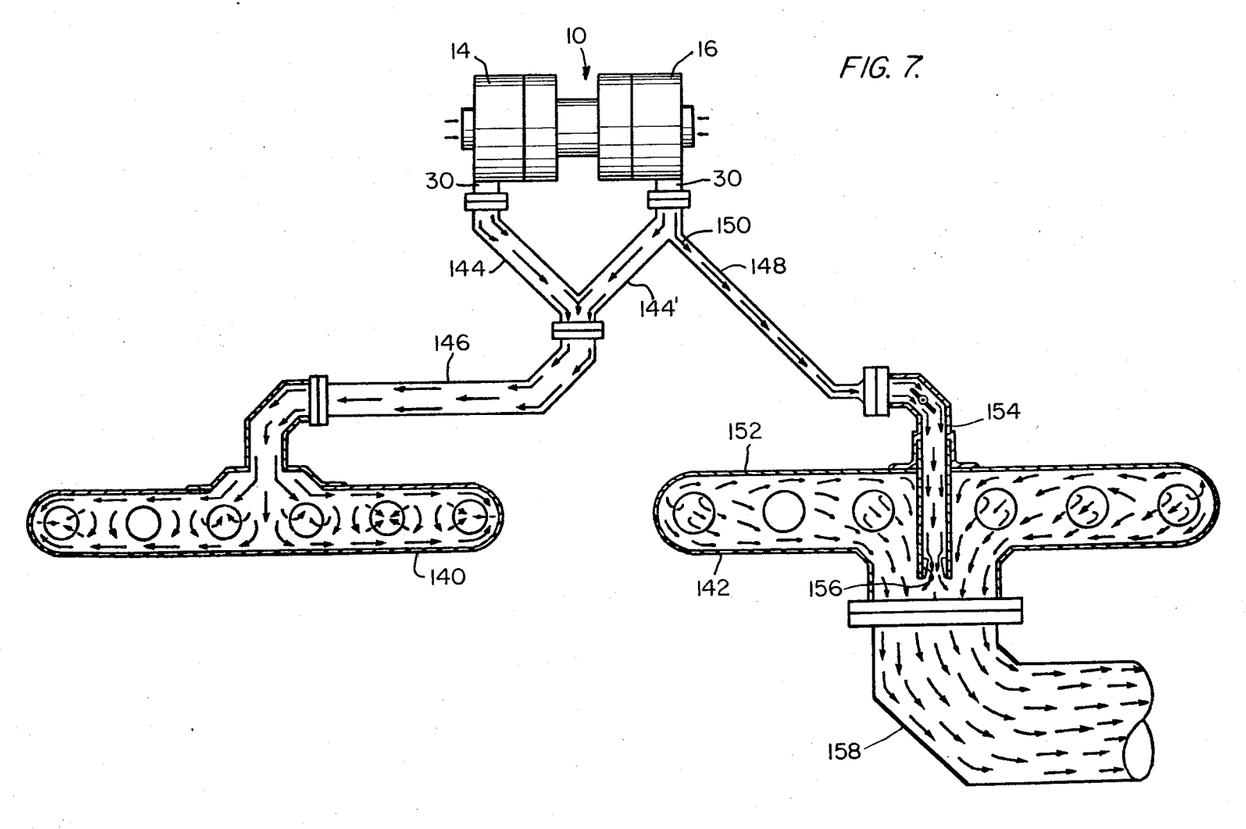
FIG. 7 illustrates an example wherein a pair of compressors are connected to the air manifold of a diesel cycle engine and a portion of the output from one of the blowers is associated with the exhaust manifold of the engine.

In FIG. 7 there is an arrangement of elements similar to that described and referred to in FIG. 6, except that the air volumes received by each of its manifolds 140 and 142 varies. The greater flow reaches the intake manifold 140 through the tubes 144, 144' and 146. This flow is therefore from both compressors.

The tube 144' is provided with a branch tube 148 and at the junction of tube 148 and 144' there is provided a shut-off valve so that the portion of the compressed air from the outlet 30 flowing to the tube 148 may be controlled. Tube 148 is connected to the exhaust header 152, via tube 154. The lower end of tube 154 has a Venturi construction 156 which assists in mixing the air directed into the exhaust header 152 with the exhaust gases flowing to the exhaust pipe 158.

What is claimed is:

1. A supercharger for an internal combustion engine comprising a housing, a shaft journaled in said housing and supporting on either end an air compressor; a turbine wheel centrally journaled to said shaft and means for directing pressure oil to the turbine wheel and thence from the housing; wherein the compressors comprise vaned compressors with the curvature of the vanes being in opposite directions at opposite ends of the shaft; wherein the supercharger is combined with an internal combustion engine having an inlet header and an exhaust system wherein one of the compressors is connected by a conduit to the internal combustion engine inlet header and the other of the compressors is connected by a conduit to the exhaust system of the internal combustion engine.

2. The invention defined in claim 1 including conduit means directing compressed air from the compressors to inlet headers of an internal combustion engine.

3. The turbocharger as defined in claim 1 wherein the connection between the compressor and the exhaust system includes a venturi passage in the compressed air conduit.

4. The turbocharger as defined in claim 1 wherein the conduits directing compressed air to the exhaust system includes a flow control valve.

5. The supercharger is defined in claim 1 wherein the compressed air from each of the compressors is directed to the inlet header of an internal combustion engine; and to a branch conduit from one of the compressors to the exhaust system of the internal combustion engine.

* * * * *